May 9, 1967 W. E. EVANS, JR 3,319,227

BI-DIRECTIONAL MANUAL PULSE GENERATOR

Filed Aug. 8, 1963

WILLIAM E. EVANS, JR.
INVENTOR.
BY Samuel Lindenberg
Arthur Freilich
ATTORNEY 3,319,227
Patented May 9, 1967

3,319,227

BI-DIRECTIONAL MANUAL PULSE GENERATOR

William E. Evans, Jr., Los Altos Hills, Calif., assignor to A. B. Dick Company, Chicago, Ill., a corporation of Illinois Filed Aug. 8, 1963, Ser. No. 300,830
7 Claims. (Cl. 340—172.5)

This invention relates generally to pulse generator means and more particularly to manually actuatable pulse generator means which find particular utility in information display systems.

In recent years, many different types of systems have been developed including cathode ray tube display devices for displaying information, such as characters, represented by digital data signals derived from a digital computer. In such display systems, a need has arisen for the provision of means available to the display device operator enabling him to designate a particular displayed character in order that the designated character can, for example, be modified. As a consequence, of that need it has been suggested that an index marker be generated and displayed along with the characters and that means be incorporated in the system for permitting the operator to move the marker relative to the displayed characters to thereby enable him to designate a particular character. To date, most means which have been suggested for providing the operator with this capability have been somewhat unsatisfactory due to their relative complexity and expense. More important however, they have been unsatisfactory because they make no attempt at providing the operator's task of precisely and quickly moving the marker to a desired point on the display with what may be called a natural "feel."

In view of the above, it is an object of this invention to provide a display device including means enabling an operator to easily and precisely and rapidly move a displayed index marker.

In accordance with the disclosed embodiment of the present invention, a counter is provided whose count is incremented in synchronism with address information stored in a memory address register. The counter and memory address register are each cyclic devices having cycles including the same number of different states. Each successive address stored in said memory address register causes the contents of a different location to be accessed from a digital memory. The contents from each location comprise a character code which is coupled through character generator means to a display device which displays a character represented by said code. Most display devices require displayed information to be periodically refreshed and consequently the memory address register will cycle for as long at it is desired that the displayed information continue to be displayed. The counter of course, will cycle in synchronism with the memory address register. A detector apparatus is provided to detect a predetermined unique state of said counter and in response to that state, an index marker is generated. By causing the counter cycle to advance or recede with respect to the memory address register cycle, the index marker will be moved relative to the displayed characters. The counter cycle is moved relative to the memory address register cycle by the operator utilizing a manual pulse generator means enabling him to selectively generate counter increment or decrement pulses.

It is a further object of this invention to provide an improved manual pulse generator means which is relatively simple in construction and consequently inexpensive to provide and reliable in operation.

It is a further object of this invention to provide a bi-directional manual pulse generator means capable of providing a number of first pulses proportional to the amount of movement of a member in a first direction and a number of second pulses proportional to the amount of movement of said member in a second direction.

Consequently, in accordance with a further aspect of the present invention, a manual pulse generator means is provided which includes a member movable in opposite first and second directions under manual control. First and second ratchet devices are coupled to the member for movement therewith. First and second pawl means are coupled to said first and second ratchet devices and act to prohibit movement of said first ratchet device in said first direction and said second ratchet device in said second direction. Said first and second pawl means serve to follow serrations provided on said first and second ratchet devices. Transducer means coupled to said pawl means are responsive to movement of said pawl means for generating pulses.

It is pointed out that although the bi-directional manual pulse generator means is disclosed herein in a display system in which it finds particular utility, it should be understood that it can in addition, be advantageously utilized in innumerable other systems where it is desired to generate a number of distinguishable first and second pulses dependent upon the amount and direction of movement of a manually actuatable member.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
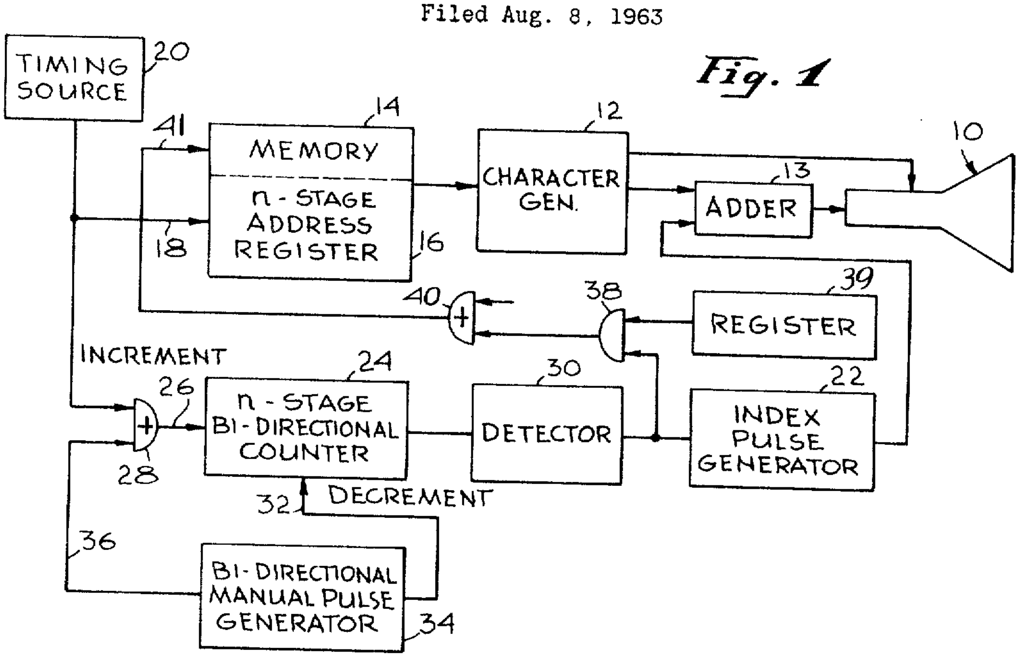
FIGURE 1 is a block diagram of a display system embodying the invention.

Attention is now called to FIGURE 1 which illustrates a display system embodying the present invention. The display system includes a display cathode ray tube 10 which is responsive to deflection signals provided by character generator 12 and video signals derived from adder circuit 13 for displaying characters, which can for example, be alpha-numeric characters. The character generator 12 provides a video signal input to adder circuit 13. The deflection and video signals are developed by the character generator in response to digital data signals accessed from a digital memory 14. The memory 14 can be conventional in construction and include a plurality of memory locations, each location adapted to store a character code. Signals representative of character code data are derived from a particular location in the memory 14 in response to address information stored in address register 16 specifying that location.

The address register 16 includes appropriate logic permitting address information stored therein to be incremented in response to pulses appearing on input line 18. The address register 16 is a cyclic device including $n$ binary stages and consequently capable of defining $2^n$ different states. Each successive pulse appearing on line 18 causes the address information in the counter 16 to be incremented by 1. The appearance of $2^n$ successive pulses on line 18 will cause the address register 16 to be incremented through one complete cycle. The input line 18 is connected to the output of a timing pulse source 20.

In response to the generation of each timing pulse by source 20 and the consequent incrementing of the information in address register 16, the character code contents of a different memory location will be accessed and transferred to the character generator 12. In response thereto the character generator 12 will provide deflection and video signals which cause the cathode ray tube 10 to display the character represented by the accessed character code. During each cycle of the address register 16, the contents of all of the locations in the memory 14 will be accessed and as a consequence, a character corresponding to each of those locations will be displayed by tube 10. Inasmuch as information displayed on the face of a cathode ray tube has to be periodically refreshed in order to maintain the display, the address register 16 will continue to cycle for so long as the display is to be maintained.

As previously noted, it is desirable to permit an operator to be able to designate a particular character out of a plurality of characters displayed by the cathode ray tube 10. In order to provide an operator with this capability, a generator 22 is provided for applying a video signal to adder 13 which causes the development of an index marker adjacent to or superimposed upon the character displayed concurrently therewith. In order to control the time of energization of the generator 22 so as to thereby allow the operator to move a displayed index marker relative to displayed characters, a bi-directional counter 24 is provided. The bi-directional counter 24 can be similar in construction to the address register 16. More particularly both the address register 16 and bi-directional counter 24 are cyclic devices including *n* binary stages and responsive to pulses provided to input lines 18 and 26 respectively for incrementing the information stored therein. Inasmuch as the address register 16 and bi-directional counter 24 have the same number of stages, each is capable of defining the same number of states. By connecting the output of timing pulse source 20 to the input of Or gate 28 whose output is connected to the line 26, the address register 16 and bi-directional counter 24 can be driven in synchronism. The output of the bi-directional counter 24 is connected to the input of a detector 30 which is responsive to a unique state of the counter 24. In response to counter 24 assuming that unique state, the detector 30 provides a pulse to generator 22 to cause an index marker to be displayed by the cathode ray tube 10.

By driving the address register 16, and bi-directional counter 24 in synchronism, the index marker displayed by the cathode ray tube 10 will appear adjacent the same character for each cycle of the address register 16 and bi-directional counter 24. The index marker can be moved relative to the displayed characters, however by shifting the phase of the bi-directional counter cycle with respect to the address register cycle. Whereas the address register 16 is capable of being incremented only, the bi-directional counter 24 is capable of being both incremented and decremented. That is, pulses applied to the line 26 cause the count in the counter 24 to advance while pulses applied to the line 32 cause the count in the counter 24 to recede. It should be apparent that by incrementing and decrementing the count in counter 24, the index marker can be respectively moved forwardly and rearwardly with respect to the characters displayed by the cathode ray tube 10.

In order to permit the bi-directional counter 24 to be incremented or decremented under the control of an operator, a bi-directional manual pulse generator 34 is provided. Movement of a member in a first direction will cause a number of pulses proportional to the amount of movement to be applied to conductor 36 connected to the input of Or gate 28. On the other hand, movement of the member in a second direction will cause a number of pulses to be applied to conductor 32 proportional to the amount of movement. In this manner, a display system operator can move the index marker relative to a plurality of displayed characters for designating a particular character. Once a particular character is designated, it can be modified by changing the code in the memory 14 stored in the location corresponding to the designated character.

In order to accomplish this modification, the output of detector 30 can be coupled to the input of an And gate 38. A second input to the And gate 38 can be connected to the output of a register 39. Keyboard means (not shown) can be provided, enabling the operator to enter a desired code into register 39. In response to the counter 24 assuming the predetermined unique state detected by detector 30, the gate 38 will be enabled to cause the contents of register 39 to be applied through Or gate 40 to the data input terminal 41 of memory 14. Since adjustment of the bi-directional manual pulse generator 34 permits an operator to cause the predetermined unique state of counter 24 to be coincident with any one of the states definable by address register 16, the contents of register 39 can be entered into any one of the memory locations selected by the operator. Of course, modification of a code stored in memory will cause the information displayed by cathode ray tube 10 to be modified during the subsequent cycle of the address register 16. A second input to Or gate 40 enables blocks of information to be entered into memory 14 from some external source such as a digital computer.

Figure 2:
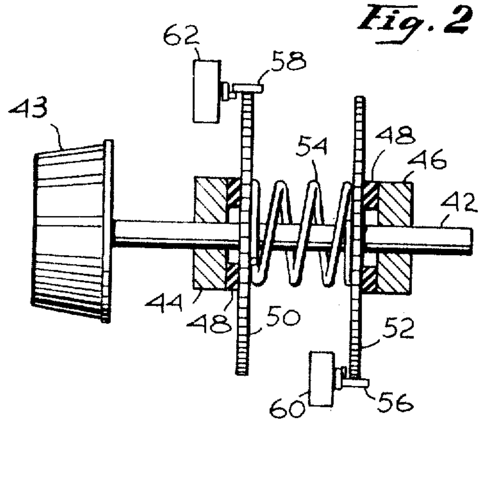
FIGURE 2 is a side view of the manually operable portion of the bi-directional manual pulse generator of FIGURE 1.
Figure 3:
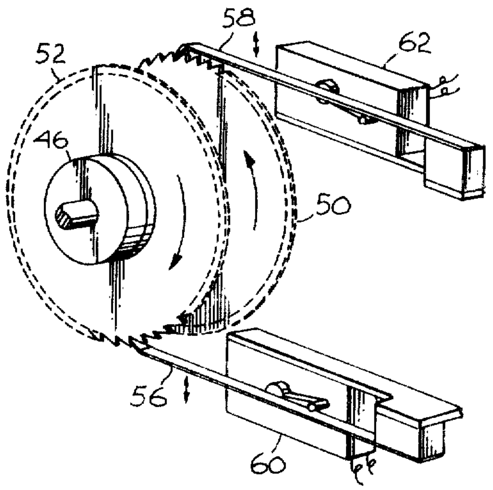
FIGURE 3 is a perspective view of the manually operable portion of the bi-directional manual pulse generator of FIGURE 1.

Attention is now called to FIGURES 2 and 3 which illustrate the manually operable portion of a preferred embodiment of the bi-directional manual pulse generator 34 of FIGURE 1. The manually operable portion includes a knob 43 secured to a shaft 42 mounted for rotational movement. Secured on the shaft 42 are a pair of spaced collars 44, 46. Secured to each of the collars 44, 46, is a ring 48, formed of a material having a relatively high coefficient of friction such as cork. Disposed on the shaft 42 between the opposed rings 48 are first and second ratchet wheels 50 and 52. The ratchet wheels 50 and 52 are mounted on the shaft 42 so that they can rotate relative to the shaft 42. A helical spring 54 is mounted on the shaft 42 between the spaced ratchet wheels 50 and 52 and urges the wheels into clutched or frictional engagement with the rings 48. The ratchet wheels 50 and 52 have oppositely directed serrations on the periphery thereof. Engaged with the serrations in wheel 50 is a spring follower or pawl 56. Similarly engaged with the serrations in wheel 52 is a spring follower or pawl 58. A pair of transducers 60 and 62 are respectively supported adjacent the spring followers 56 and 58. The transducers 60 and 62 can comprise conventional phonograph cartridges of, for example, the piezoelectric crystal type.

In the operation of the manually operable portion of the pulse generator 34 illustrated in FIGURES 2 and 3, clockwise rotational movement of the knob 40 and shaft 42 will cause ratchet wheel 50 to move clockwise. Ratchet wheel 52, however, will slip on ring 48 as it will be prevented from moving as a result of the spring follower 58 being engaged against a vertical portion of the serrations on the periphery of ratchet wheel 52. On the other hand, counterclockwise movement of the knob 40 and shaft 42 will cause ratchet wheel 52 to move counterclockwise while spring follower 56 will prevent any rotational movement of ratchet wheel 50.

In response to rotational movement of ratchet wheel 50, spring follower 56 will follow the serrations on the periphery thereof. As a consequence, for each unit of rotational movement of the ratchet wheel 50 (a unit of rotational movement being considered as an amount of movement sufficient to cause one of the peripheral serrations to move past a spring follower) the transducer 60 will provide one output pulse.

Figure 4:
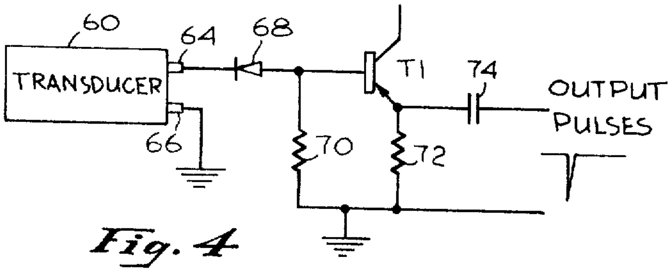
FIGURE 4 is a schematic diagram illustrating the circuit connected to the transducer means of FIGURES 1 and 2 for generating electrical pulses.

Attention is now called to FIGURE 4 which illustrates a circuit for coupling the transducers 60 and 62 to the conductors 32 and 36 of FIGURE 1. Transducer 60 is provided with a pair of output terminals 64 and 66. Terminal 66 is grounded and terminal 64 is connected to the cathode of a diode 68. The anode of the diode is connected to the base of a PNP transistor T1. The base and emitter of transistor T1 are respectively coupled through resistors 70 and 72 to ground. The collector of transistor T1 is connected to a source of negative potential. A coupling capacitor 74 couples the emitter of transistor T1 to conductor 32 of FIGURE 1. In the operation of the circuit of FIGURE 4, pulsed movement of the pawl 56 causes transducer 60 to provide a negative potential on its terminal 64. This negative potential is coupled through diode 68 to the base of transistor T1, thereby forward biasing transistor T1 and lowering the potential on the emitter. The emitter potential is coupled through capacitor 74 to conductor 32.

From the foregoing it should be apparent that a simple, reliable, and extremely inexpensive bi-directional manual pulse generator has been provided which can be utilized in a variety of applications but which finds particular utility in display systems. Even more important however, the manual pulse generator disclosed herein permits an operator to develop an output pulse rate which is directly proportional to the rotational speed manually imparted to the shaft 42 so as to enable the operator to perform fast slewing and slow, carefully controlled stepping in a very natural manner. By causing the clockwise movement of the knob to move the index marker to the right and counterclockwise of the knob to move the index marker to the left, the operator can very quickly acquire the facility for working with this phase of the display system because of the naturalness of exercising control in this manner over the visually represented index marker. It is also pointed out that the construction of the disclosed manual pulse generator assures complete isolation between the two output channels, thereby assuring more positive incrementing and decrementing of the counter 24 which in turn provides the operator with extremely good control over the position of the index marker.

What is claimed is:

1. In combination with a shaft mounted for manual bi-directional rotational movement, means for generating a first pulse in response to each unit of rotational shaft movement in a first direction and a second pulse in response to each unit of rotational shaft movement in a second direction, said means comprising a first ratchet wheel mounted for rotational movement; a second ratchet wheel mounted for rotational movement; slip-clutch means coupling said shaft to each of said first and second ratchet wheels; first pawl means engaged with said first ratchet wheel for preventing rotational movement thereof in a first direction; second pawl means engaged with said second ratchet wheel for preventing rotational movement thereof in a second direction; and first and second transducer means respectively physically coupled to said first and second pawl means and responsive to movement thereof for respectively developing first and second pulses.

2. The combination of claim 1 wherein said slip-clutch means includes first and second collars secured to said shaft; means mounting said first and second ratchet wheels on said shaft for rotational movement relative thereto; and spring means urging said first and second ratchet wheels into respective frictional engagement with said first and second collars.

3. In combination with a shaft mounted for manual bi-directional rotational movement, means for generating a first pulse in response to each unit of rotational shaft movement in a first direction and a second pulse in response to each unit of rotational shaft movement in a second direction, said means comprising a first ratchet wheel mounted for rotational movement and having a series of serrations projecting in a first direction defined along the periphery thereof; a second ratchet wheel mounted for rotational movement and having a series of serrations projecting in a second direction defined along the periphery thereof; slip-clutch means coupling said shaft to each of said first and second ratchet wheels; first pawl means engaged with said serrations on said first ratchet wheel for preventing rotational movement thereof in a first direction; second pawl means engaged with said serrations on said second ratchet wheel for preventing rotational movement thereof in a second direction; and first and second transducer means respectively physically coupled to said first and second pawl means and responsive to each serration moved past said first and second pawl means for respectively developing first and second pulses.

4. In combination with counter apparatus having first and second terminals and being respectively responsive to pulses provided thereon for counting up and counting down, means for providing pulses on said first and second terminals comprising a member mounted for bi-directional movement; a first ratchet device; a second ratchet device; slip-clutch means coupling said member to each of said first and second ratchet devices; first pawl means engaged with said first ratchet device for preventing movement thereof in a first direction; second pawl means engaged with said second ratchet device for preventing movement thereof in a second direction; first transducer means responsive to movement of said first pawl means for developing a first pulse; second transducer means responsive to movement of said second pawl means for developing a second pulse; and means respectively connecting said first and second transducer means to said first and second terminals of said counter apparatus.

5. In a display system including a memory address register and a counter and timing means for incrementing said register and said counter in synchronism, manually operable means for selectively incrementing or decrementing said counter relative to said memory address register, said means comprising a shaft mounted for bi-directional rotational movement; a first ratchet wheel mounted for rotational movement; a second ratchet wheel mounted for rotational movement; slip-clutch means coupling said shaft to each of said first and second ratchet wheels; first pawl means engaged with said first ratchet wheel for preventing rotational movement thereof in a first direction; second pawl means engaged with said second ratchet wheel for preventing rotational movement thereof in a second direction; and first and second transducer means respectively responsive to movement of said first and second pawl means for respectively developing first and second pulses; and means coupling said first and second transducer means to said counter for causing each of said first pulses developed to increment said counter and each of said second pulses developed to decrement said counter.

6. In a display system including a digital memory having a plurality of locations wherein each location stores a character code and a memory address register for storing address information identifying one of said plurality of locations; a source of timing pulses; means responsive to each of said timing pulses for incrementing said address information in said memory address register to cause said memory address register to successively define each of a plurality of different states equal in number to said plurality of memory locations; means coupled to said memory address register for successively accessing the character codes from said memory locations successively identified by said memory address register; character generator means responsive to said successively accessed character codes for successively generating video signals; display means responsive to said successively generated video signals for successively displaying characters represented by said video signals; a bi-directional counter capable of successively defining a plurality of different states equal in number to said number of memory locations; an index pulse generator; detector means responsive to a unique state defined by said counter for actuating said index pulse generator; said display means responsive to said actuation of said index pulse generator for displaying a marker; means connecting said source of timing pulses to said counter for incrementing said counter in synchronism with said memory address register; and manually operable bi-directional pulse generator means connected to said counter for enabling said cycle defined by said counter to be shifted in time with respect to said cycle defined by said memory address register.

7. The display system of claim 6 wherein said bi-directional pulse generator means comprises a shaft mounted for bi-directional rotational movement; a first ratchet wheel mounted for rotational movement; a second ratchet wheel mounted for rotational movement; slip-clutch means coupling said shaft to each of said first and second ratchet wheels; first pawl means engaged with said first ratchet wheel for preventing rotational movement thereof in a first direction; second pawl means engaged with said second ratchet wheel for preventing rotational movement thereof in a second direction; first transducer means responsive to movement of said first pawl means for developing a first pulse; second transducer means responsive to movement of said second pawl means for developing a second pulse; and means respectively connecting said first and second transducer means to said first and second terminals of said counter apparatus.

References Cited by the Examiner

UNITED STATES PATENTS

| | | | |
|---|---|---|---|
| 1,103,916 | 7/1914 | Lawrence | 200—61.39 |
| 1,466,279 | 8/1923 | Gadbury | 200—45 |
| 1,791,516 | 2/1931 | Stafford | 200—153.15 |
| 2,663,495 | 12/1953 | Ramsell et al. | 235—61 |
| 2,998,188 | 8/1961 | Mast et al. | 235—92 |
| 3,037,192 | 5/1962 | Everett | 340—172.5 |
| 3,112,067 | 11/1963 | Ernest et al. | 235—132 |

ROBERT C. BAILEY, *Primary Examiner.*

R. M. RICKERT, *Assistant Examiner.*